(12) United States Patent
Widmark

(10) Patent No.: US 9,032,898 B2
(45) Date of Patent: May 19, 2015

(54) ARRANGMENT FOR DYNAMIC CONTROL OF RUNNING TRIM AND LIST OF A BOAT

(71) Applicant: Humphree AB, Goteborg (SE)

(72) Inventor: Christer Widmark, Partille (SE)

(73) Assignee: Humphree AB, Gothenburg (SE)

(*) Notice: Subject to any disclaimer, the term of this patent is extended or adjusted under 35 U.S.C. 154(b) by 113 days.

(21) Appl. No.: 14/010,525

(22) Filed: Aug. 27, 2013

(65) Prior Publication Data

US 2014/0053766 A1 Feb. 27, 2014

Related U.S. Application Data

(60) Provisional application No. 61/693,741, filed on Aug. 27, 2012.

(51) Int. Cl.
*B63B 1/32* (2006.01)

(52) U.S. Cl.
CPC ............. *B63B 1/32* (2013.01); *B63B 2001/325* (2013.01); *B63B 2221/24* (2013.01); *Y02T 70/12* (2013.01)

(58) Field of Classification Search
CPC ........................................................ B63B 1/32
USPC ................................................ 114/284–285
See application file for complete search history.

(56) References Cited

U.S. PATENT DOCUMENTS

| 1,264,320 | A  | * | 4/1918  | Metzler  | 114/145 R |
|-----------|----|---|---------|----------|-----------|
| 3,327,671 | A  | * | 6/1967  | Comins   | 114/285   |
| 6,006,689 | A  | * | 12/1999 | Olofsson | 114/285   |
| 8,327,790 | B2 | * | 12/2012 | Snow     | 114/285   |
| 8,387,551 | B2 | * | 3/2013  | Muller   | 114/285   |
| 8,622,012 | B2 | * | 1/2014  | Olofsson | 114/284   |
| 8,631,753 | B2 | * | 1/2014  | Morvillo | 114/285   |
| 2010/0043691 | A1 | * | 2/2010 | Snow    | 114/286   |
| 2014/0053766 | A1 | * | 2/2014 | Widmark | 114/285   |

* cited by examiner

*Primary Examiner* — Lars A Olson
*Assistant Examiner* — Jovon Hayes
(74) *Attorney, Agent, or Firm* — Ian J. Griswold; Johnson, Marcou & Isaacs, LLC

(57) ABSTRACT

An arrangement for dynamic control of running trim, list and/or yaw of a boat, having a housing member comprising a front plate a and rear plate, an interceptor member, an actuating means, a drive unit, and a guiding arrangement, arranged to guide said interceptor member between a first position and a second end position, said actuating means being arranged to displace said interceptor member in a movement between said first and second positions in relation to said housing member wherein said guiding arrangement has a first guiding member and a second guiding member arranged to interact with each other to provide a parallel movement of said interceptor member in relation to said housing member, said first guiding member being a torque transferring, rotatable element having a base body arranged to extend transverse to the direction of displacement of said interceptor member.

18 Claims, 6 Drawing Sheets

ARRANGEMENT FOR DYNAMIC CONTROL OF RUNNING TRIM AND LIST OF A BOAT

CROSS REFERENCE TO RELATED APPLICATION

This application claims the priority benefit of U.S. Provisional Application 61/693,741 filed on Aug. 27, 2012, which is incorporated by reference herein in its entirety.

TECHNICAL FIELD

The present invention relates to an arrangement for dynamic control of running trim and list of a boat, said arrangement having a housing member, an interceptor member, an actuating means, a drive unit operated by a power supply means, and a guiding arrangement.

BACKGROUND ART

Many different devices and arrangements intended for dynamic control of running trim of vessels or boats are previously known. One such arrangement comprises the use of a so-called interceptor with a plate member arranged transversally to the bottom of the vessel and arranged to increase the water pressure acting on the bottom of the hull during operation of the boat. Thus, the running trim of the boat or vessel is changed.

A drawback with many known arrangements is the risk for malfunction and/or damages due to the force of the water acting on the interceptor member and components thereof, resulting in a decrease of performance and a shortening of the expected lifespan of the arrangement, together with the need for maintenance. Known interceptor arrangements are disclosed by EP 1 075 415 and WO2009/113923, among others.

There is therefore a need for a more robust and reliable arrangement for dynamic control of running trim and list of a boat.

DISCLOSURE OF THE INVENTION

The object of the present invention is to eliminate or at least to minimize the problem described above. This is achieved through an arrangement according to the appended claim 1, whereby the interceptor can be guided to perform its movements in a controlled way without risking malfunction and/or damages due to external forces.

It is advantageous to place the first guiding member for guiding the movement of the interceptor member between said interceptor member and the rear plate of the housing. Thereby, the application of forces to the arrangement will not result in a bending or displacement of the interceptor itself, but rather will be absorbed by the arrangement in such a way that the performance of the interceptor is substantially unaffected.

By also allowing a base body of the guiding arrangement to act as a roll between the interceptor member and the housing, the forces applied can be divided equally over the entire length of the arrangement, further avoiding damage or displacement of the interceptor means. It is even more beneficial for the base body to have a diameter that is substantially the same as the effective diameter of the toothed wheels interacting with the second guiding arrangement, since this will allow all members of the base body to move jointly, further allowing a uniform distribution of forces along the arrangement without inducing extra strains, and which also enables a design where the interaction between the toothed wheels and the gear racks in a preferred embodiment are substantially without any compression forces, since the base body in its self may handle the compression forces without any need for the toothed wheels to also participate in handling compression forces.

It is beneficial for the base body of the guiding arrangement to comprise toothed members that can be connected to each other by means of a male female interfit form to allow for transmission of torque and a plurality of shorter rolling members. Thereby, the rolling of the guiding arrangement can be made uniform and the length of the rod constructed can be adapted to each specific application in a given interceptor arrangement, in a flexible and cost effective manner.

Further, it is advantageous to provide toothed surfaces for interaction with the guiding arrangement in an inner surface of the housing as well as on a surface of the interceptor member, to enable a toothed interaction of the guiding arrangement with the interceptor as well as with the housing. Thereby, the movement of the interceptor in relation to the housing can be further guided and controlled.

By providing a separate guiding device comprising the toothed guided surfaces and a matching recess in the housing or interceptor or both, the toothed surfaces for interaction with the guiding arrangement can be replaced if needed without requiring replacing the entire arrangement, which is beneficial for increasing the lifespan of the arrangement.

It is also advantageous to provide roller members placed on the other side of the interceptor from the point of view of the guiding member, to provide for a low friction movement of the interceptor in relation to the housing.

More advantages and benefits of the invention will become readily apparent to the person skilled in the art in view of the detailed description provided further below.

BRIEF DESCRIPTION OF THE DRAWINGS

The invention will now be described in more detail with reference to the appended drawings, wherein.

DETAILED DESCRIPTION OF THE INVENTION

In the description below, reference will be made to directions such as rear, front, up and down, if not otherwise stated. These directions are given with reference to the stem and stern of the boat at operation in a forward direction.

In the following, an arrangement according to the invention will be described with reference to FIG. 1-7. Furthermore, a preferred embodiment and alternative embodiments will be disclosed. The arrangement 1 according to the invention is intended for dynamic control of running trim, list and yaw of a boat or a vessel and dampening of boat motion. The arrangement 1 according to the invention is intended to generate an increase in pressure on a hull bottom directly ahead of a transom edge 4 by intercepting the flow with an interceptor blade 5 below the transom edge 4 to substantially raise the pressure over a large area. This results in a high hydrodynamic lift while the relatively small area of the projected interceptor blade 5 results in a low hydrodynamic drag.

In most applications the interceptor blade is arranged so as to extend (i.e so as to displaced in relation to a fully retracted position) proportionally a small part of the interceptor blade length. Typically the extension of the blade can be 2-14% of the interceptor blade length. However it should be noted that the invention is not limited to such dimensions only. Generally a large length to extension ratio gives the best efficiency of dynamic lift for the arrangement.

Figure 1:
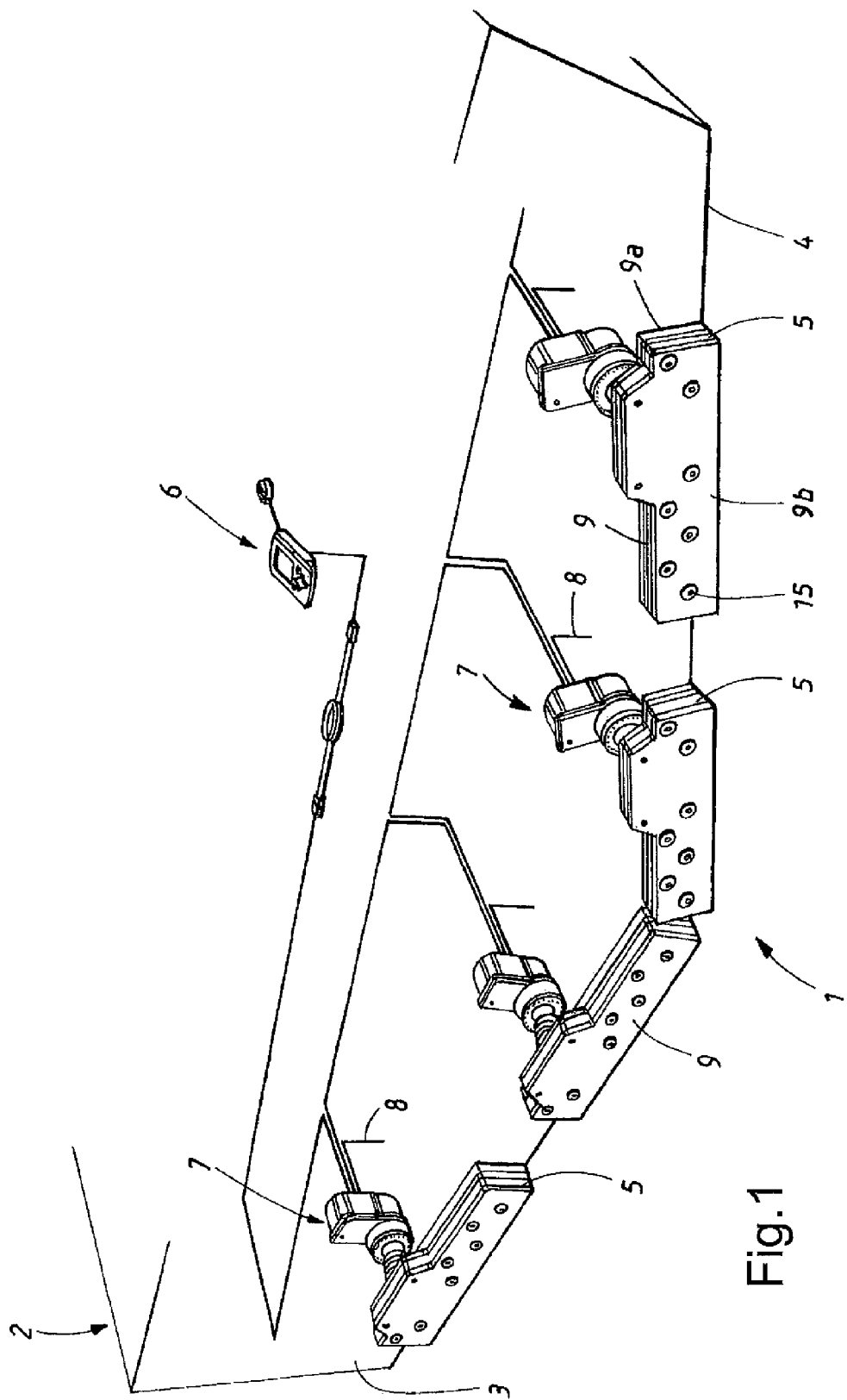
FIG. 1 shows a schematic perspective view of a stem of a boat arranged with a plurality of interceptor arrangements according to an exemplary design in connection with the invention.

FIG. 1 shows a schematic perspective view of several interceptor assemblies 1 according to a preferred embodiment of the invention arranged to the hull 2 on a stern 3 of the boat or the vessel. The arrangement 1 is attached to a substantially vertical surface of the stern 3 and extends along a limited portion of the horizontal width of the vertical surface along the transom edge 4 of the stern 3.

Even though FIG. 1 shows four different arrangements 1 according to the embodiment, it should be noted that the invention is not limited to such a number only. In other words, the invention can be implemented with one, two or more arrangements 1 depending on the actual need in each application.

The arrangement 1 according to the invention is connected to a control unit 6 with a control panel provided on a bridge of the boat. The operator of the boat can maneuver the trim and list of the boat via the control panel. This is done simultaneously as the driver regulates the speed and the course of the boat, which is done via a throttle control and a steering wheel (not shown), respectively. The arrangement can also be operated by automatic functions that maneuver the trim list and yaw of the boat from different signals as boat speed, engine speed, steering, boat motion sensors.

Each arrangement 1 according to FIG. 1 comprises a drive unit 7, which is connected to and regulated by the control unit 6. The drive unit 7 (or servo unit) is further connected to a power supply means 11 and a housing 9 of the arrangement 1. In the housing 9, the interceptor blade 5 is arranged between a front part 9a and a rear part 9b. Also, the power supply means 11 is constituted by an electrical power supply of a conventional type for marine applications.

The interceptor blade 5 and the housing 9 are suitably made of a material which is persistent to marine influence. Such materials might be fibre reinforced polymer resin, non-reinforced or reinforced plastic or composite materials, metals e.g. stainless steel or aluminium, rubber or other suitable materials.

Figure 3:
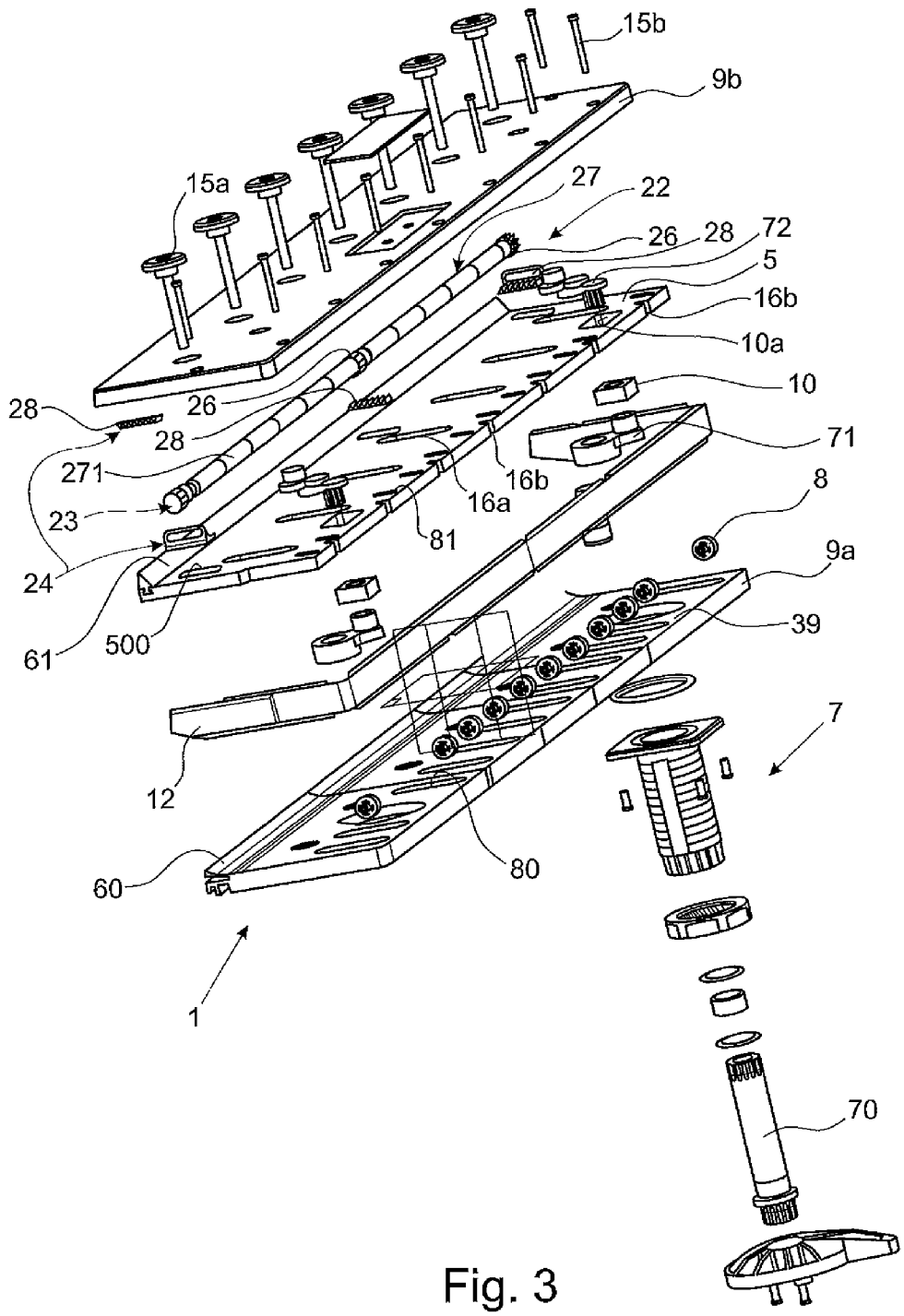
FIG. 3 shows an exploded view of the arrangement of FIG. 2.

As shown in FIG. 3, the arrangement 1 according to the invention further comprises an actuating means 10. The actuating means 10 is arranged for displacing the interceptor blade 5, preferably in a continuous linear movement, between a first end position and a second end position or vice versa in relation to the housing 9. This linear movement is generally in the vertical direction, provided that the surface of the stern 3 is oriented along a generally vertical plane. In other words, the movement of the interceptor blade 5 is suitably along the same direction as the plane along which the stern 3 is arranged.

The arrangement according to the invention is fixedly attached to the hull 2 of the boat with attachment means (not shown). The attachment means are preferably constituted of a number of through-holes in the housing 9 and fixing means, for example screws, which are attached to the hull 2 of the boat.

Figure 2:
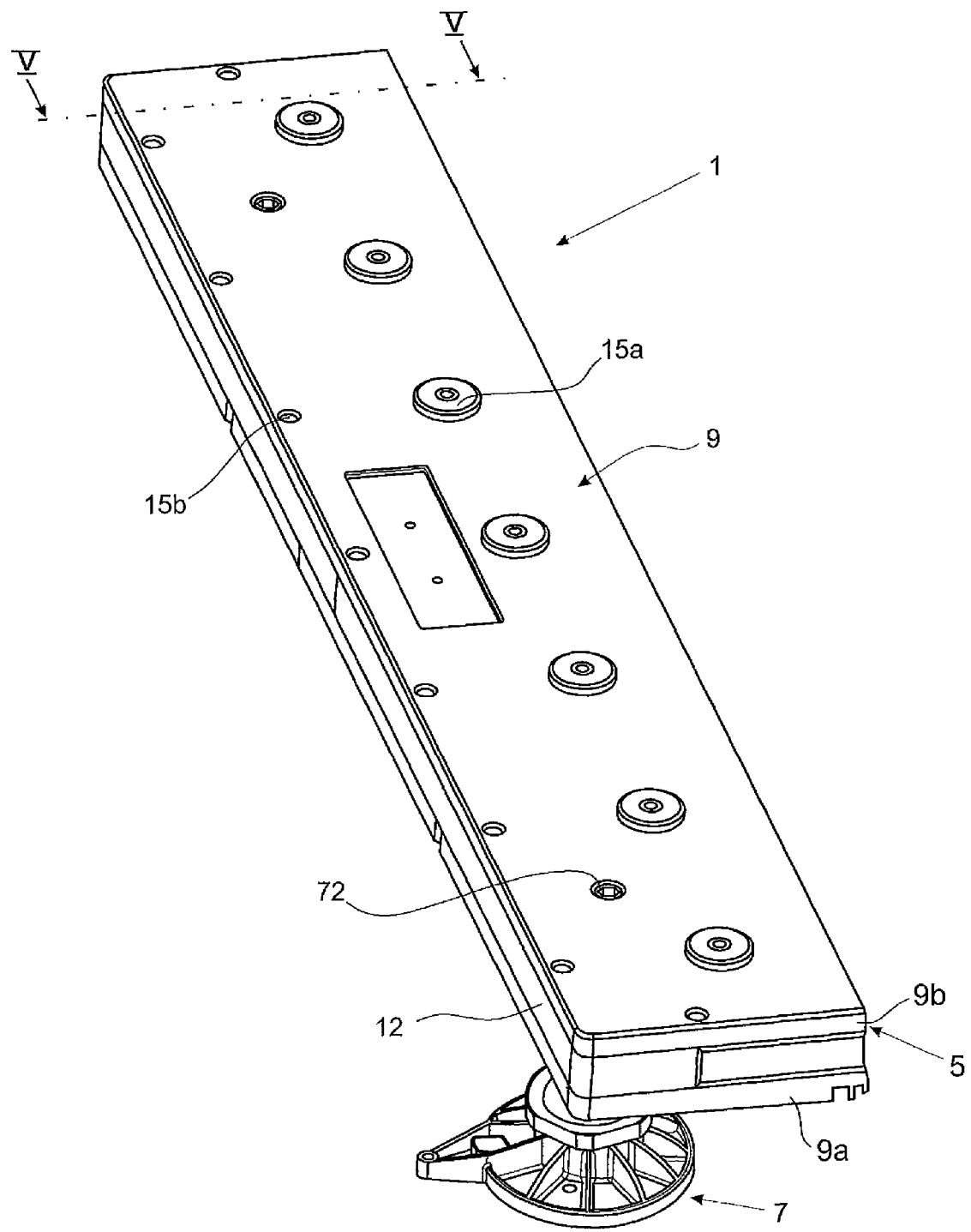
FIG. 2 shows a perspective view of a preferred arrangement of an interceptor according to the invention.

FIG. 2 shows the arrangement 1 according to the invention, with the housing 9 comprising a front plate 9a and a rear plate 9b, between which the interceptor member 5 is arranged. Enveloping said interceptor member 5 is a frame 12 that serves as a spacer between the front plate 9a and rear plate 9b and that also provides protection from particles or dirt for an interior of the housing 9.

To join the front plate 9a and the rear plate 9b, first and second attachment devices 15a, 15b are provided, preferably in the form of screws or the like that fit into holes in the front and rear plates 9a, 9b.

The interceptor blade 5 is displaceable inside the housing 9 so as to move between a first end position and a second end position, and vice versa. In the first end position the interceptor blade 5 is fully contained inside the housing 9, and in the second end position the interceptor blade 5 is partially contained inside the housing 9. The interceptor blade 5 is provided with a number of through holes 16a shown in FIG. 3, through which the first attachment means 15a of the housing 9 extend. These through holes 16a allow the interceptor blade 5 to be displaced between the first and second end positions even if the interceptor blade 5 is arranged between the front and rear sections of the housing 9 and perforated by the attachment devices 15. As mentioned above, the displacement of the interceptor blade 5 is suitably in a generally vertical direction.

Further, the interceptor blade 5 is provided with a second guiding member 24, preferably in the form of one or more toothed guiding surfaces 28 which are arranged to guide the interceptor blade 5 in a linear movement, as will be described in detail further below.

FIG. 3 is an exploded view of the arrangement 1, disclosing the rear plate 9b with attachment means 15, where first attachment means 15a are provided for joining the rear plate 9b to the front plate and extend through the through holes 16 in the interceptor member 5, and second attachment means 15b are provided for joining the rear plate 9b to the front plate 9a and squeeze the frame 12 securely into place. A number of U-shaped recesses 16b are provided in the interceptor member 5 to allow the movement of the interceptor member 5 without being hindered by the second attachment means 15b.

Between the interceptor member 5 and the rear plate 9b and at a lower end of the arrangement 1, guiding arrangement 22 are arranged to guide the movement of the interceptor member 5 at application of a displacement force. The guiding arrangement 22 comprises a first guiding member 23 in the form of an elongated rod with a base body 27, and further comprises at least two but preferably at least three toothed wheels 26 that are arranged to interact with a second guiding member 24, which includes corresponding toothed surfaces 28 provided on the interceptor member 5 and on a housing plate 9a, 9b, preferably on the rear plate 9b. Thereby, the movement of the interceptor 5 can be guided in a stable and secure way, minimizing the risk for jamming during operation and decreasing the need for maintenance and replacement of the components of the arrangement 1 according to the invention.

The base body 27 of the first guiding arrangement 23 preferably has a diameter D1 that is substantially the same as an interactive diameter D2 of the toothed wheel 26, as will be described more I detail below. Further it is shown that it is preferable to use sealings 60, 61, one 61 arranged adjacent the lower end of the interceptor member 5, to seal the gap between the rear plate 9b and the interceptor member 5 (in its retracted position) and one 61 adjacent the end of the front plate 9a to seal the gap between it and the interceptor member 5.

In another embodiment of the invention, the guiding arrangement 22 could be placed between the interceptor member 5 and the front plate 9a and still perform the functions described above, or it could alternatively be placed at an upper end of the arrangement 1, but it is especially advantageous to provide the guiding arrangement 22 as disclosed in the preferred embodiment and shown by the Figures. In this position, the guiding arrangement 22 best serve to absorb the forces applied on the arrangement 1 by the flowing water (surrounding the hull 2) and thereby prevent an undesired bending, that may otherwise lead to an undesired displacement, of the interceptor member 5. Hence it presents a design that in an easy and stable way, manages to withstand large forces without the need for additional support structures, and that requires a minimum of power input for displacement of the interceptor member 5.

The guiding arrangement 22 will also be described in more detail further below.

In one end section of the elongated housing 9, the actuating means 10 is arranged to act directly on the interceptor blade 5. The actuating means 10 is arranged to move transversally within a recess 10a of the interceptor blade 5 to displace the interceptor blade 5 in its continuous linear movement between the first and second end positions, as described above. In the shown embodiment, the actuating means 10 is in the form of a rectangular device and the recess 10a also rectangular, both having inter fitting heights but the recess 10a presenting a transversal width that is substantially larger than the width of the actuating means 10 allowing the actuating means 10 to move sideways therein 10a. The actuating means 10 is connected to the drive unit 7 which has an electrical motor connected to the power supply means 11. The electrical motor is arranged to provide a movement of the interceptor blade 5 by rotating an ex centre arm 71 extending in the gap between the housing and the interceptor, having a stub shaft with the actuating means 10 thereon, which thereby transfer the rotational movement of the arm 71 to a linear movement of the interceptor blade 5. A further support member 72 is arranged in the other gap between the housing 9 and the interceptor member 5, to further stabilize the movement. To this end, electrical motor comprises a rotating shaft 70 arranged to protrude through an opening 39 within the rectangular frame shape of the housing 9, at a position below the lowest part of the upper edge of the housing 9. Thanks to this design, i.e. using a recess in the upper half of the interceptor blade 5 to drive it, a very compact arrangement may be achieved. It is evident that this specific design feature may be made the subject for its own protection, e.g. by means of a separate divisional application, not limited to features now defined in claim 1.

Figure 4:
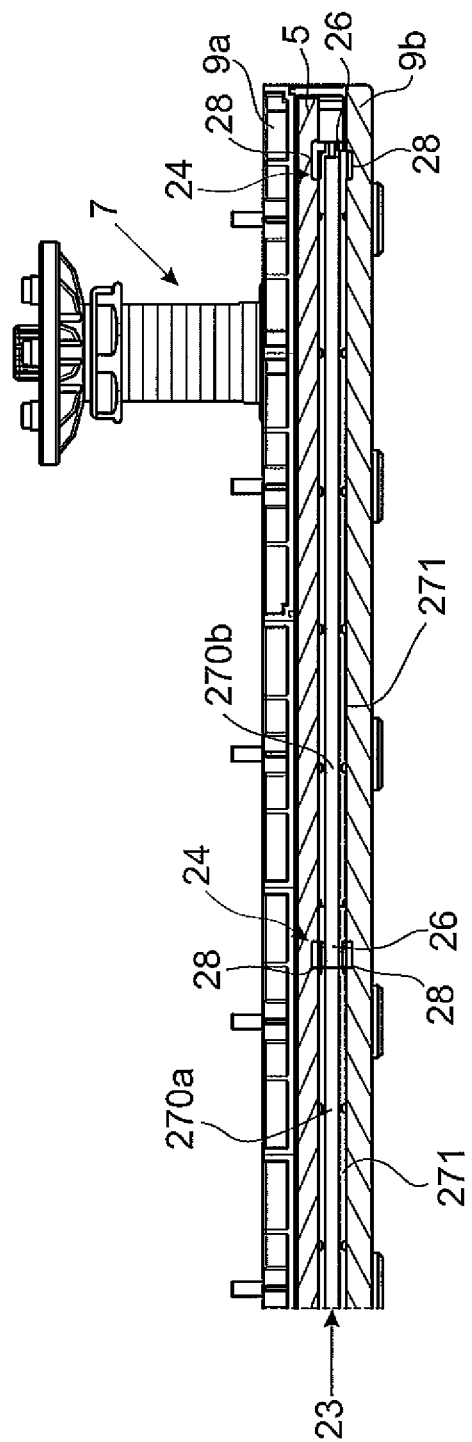
FIG. 4 shows a horizontal cross-sectional view from below of the arrangement of FIG. 2.

FIG. 4 shows the arrangement 1 in a cross sectional view from below, with the guiding arrangement 22 in place between the interceptor member 5 and the rear plate 9b. The guiding arrangement 22 includes an elongated rod 270 with toothed wheels 26, and a number of rolling members 271 arranged around it. In this embodiment the rod comprises two halves 270a, 270b inter fitted (in the middle) at their ends by a male/female connection (of any known kind, not shown), provided at each end thereof, enabling a modular arrangement for increased flexibility. There are arranged toothed wheels 26 at each outer en of the rod 270 and also in the middle thereof 270. While the movement of the interceptor member 5 is controlled by the guiding arrangement 22, including these toothed wheels 26, and roll resistance being minimized by use of the rolling members 271 said movement is also facilitated by the use of a series of roller members 8 mounted within recesses 81 within the interceptor member 5 for rolling within the longish recesses 80 within the front plate 9a, so that friction between the interceptor member 5 and the housing 9 is further prevented.

Figure 5:
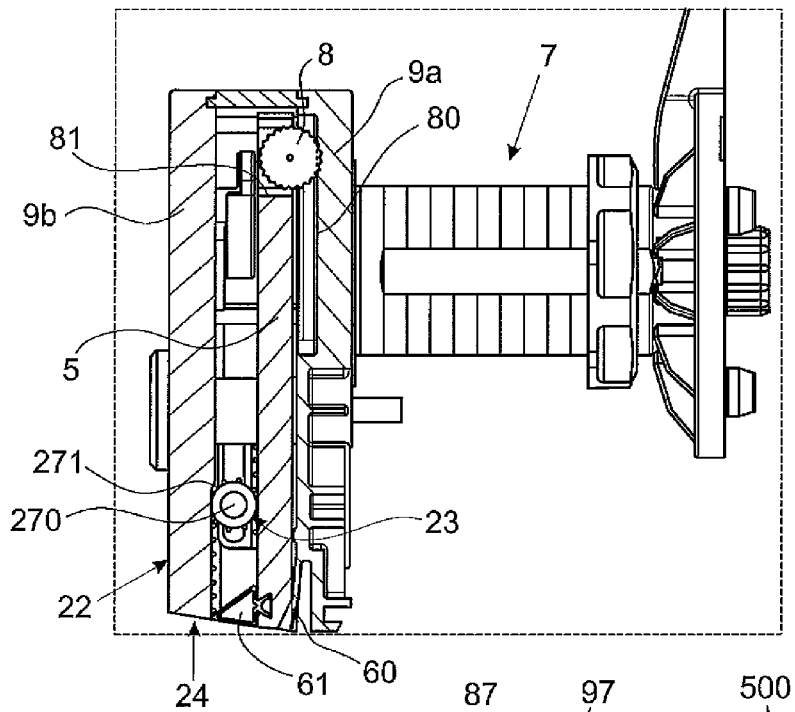
FIG. 5 shows a vertical cross-sectional view of the arrangement of FIG. 2.

In FIG. 5 the latter is shown in more detail, presenting that the roller members 8 are positioned in the upper half of the housing 9, adjacent the top of the interceptor member 5, and that the guiding arrangement 22, including the first guiding member 23, is positioned in the lower half of the housing, i.e. adjacent the lower edge of the housing 9. The roller members 8 will exactly follow the movement of the interceptor member 5, whereas the first guiding member 23 is movably arranged (in contact with the second guiding member 24) between the rear plate 9b and the interceptor member 5, implying that it will move half the distance of the movement of the interceptor member 5. The second guiding member 24 is in the form of facing gear racks 28, both on the interceptor member 5 as well as at one of the housing plates 9a, 9b, e.g. at the rear plate 9b as shown in FIG. 5. The first guiding member 23 has a base body 27 extending transversally, preferably in the form of one rod 270 having a plurality of rolling members 271 freely rotatable around the rod 270, preferably made of a relatively stiff and durable material (e.g. steel, suitable polymer and other materials appropriate in a marine environment) to act as load transferring rolls 271 between the interceptor member 5 and the housing 9.

Figure 6:
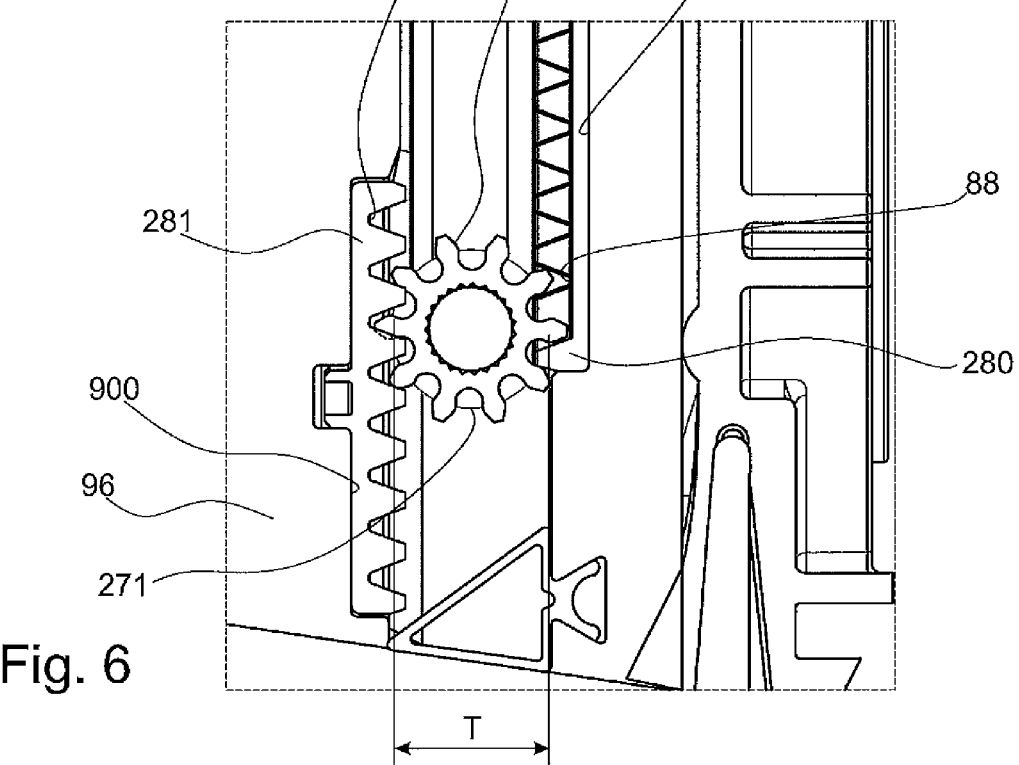
FIG. 6 shows a more detailed view of the toothed wheel of the guiding arrangement of the arrangement of FIG. 5 in cooperation with toothed guiding surfaces of the interceptor and the housing of the arrangement.

FIG. 6 discloses in more detail the interaction of a toothed wheel 26, having an effective diameter D2, with a matching second guiding member 24 in the form of a toothed guiding surface 28 provided on the interceptor member 5, and also a toothed guiding surface 28 provided on the rear plate 9b, so that the rod 270 with its toothed wheels 26 aids in providing a parallel movement of the interceptor member 5 in relation to said rear plate 9b. Thanks to the provision of at least two toothed wheels 26, one at each side of the rod formed by the guiding arrangement 22, the movement of the interceptor member 5 can be symmetrical with regards to the housing 9, to prevent jamming. To further improve the movement of the interceptor member 5, at least one additional toothed wheel 26 can be provided along the length of the guiding arrangement 22, preferably at its centre. However, the intermediate toothed wheel 26 may in a preferred embodiment not be fixed (regarding torque) in relation to the rod 270, since the toothed wheels 26 at the ends will suffice to achieve parallel movement. The main purpose of the intermediate wheel 26 is rather to assist in eliminating the rod centre to bend away due to bending loads acting on the rod 27. If desired, however, a larger number of toothed wheels 26 can of course be provided, and possibly also have one or more (or all) wheels 26 load bearing, in place of or together with load bearing rolls 271.

As shown by FIG. 6, the toothed guiding surfaces 28 of the interceptor member 5 forms part of a separate guiding device 280 that is mounted in a corresponding recess 500, extending in the direction of movement and provided in the surface of the interceptor member 5. Similarly, the toothed guiding surface 28 of the rear plate 9b forms part of a separate guiding device 281 (preferably of exactly the same kind) and is mounted in a corresponding recess 900 of said rear plate 9b. Thanks to this placement, the toothed guiding surfaces 28 can be manufactured separately and mounted on the arrangement 1 as is suitable for each particular application, and if needed due to wear and tear, the toothed guiding surfaces 28 and the guiding arrangement 22, or even just the toothed wheels 26 of the guiding arrangement 22, can be replaced without the need to replace other parts of the arrangement 1.

Figure 7:
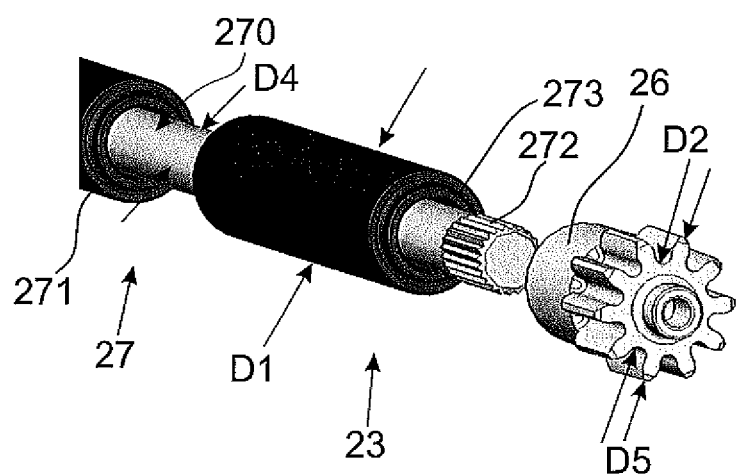
FIG. 7 shows a perspective view of a section of the guiding arrangement according to the invention.

FIG. 7 shows a perspective view of the first guiding member 23 in more detail. It is shown that the base body 27 of the first guiding member 23 comprises a plurality of rolling members 271 that are arranged on the elongated rod 270. The diameter D1 of the base body 27, preferably in the form of separate rolling members 271, is at least substantially equal to the distance T between the inner surface of the rear plate 9b and the rear surface of the interceptor member 5, such that it may roll and transfer load simultaneously. It is evident that this may also be achieved by arranging the periphery of the rod 270 with such a diameter D1, but due to production and maintenance aspects it is more beneficial to use separate rolling members 271. The rolling members have an inner hole 273 with a diameter D3 that preferably is slightly larger than the diameter D4 of the rod 270. At the ends of the rod there are arranged splines 272, or a similar arrangement, to enable easy attachment of a toothed wheel 26, i.e. arranged with matching means to allow axial fitting which is torque transferring. The effective diameter D2 of the toothed wheels 26 are equal to the diameter D1 of the rolling members 271. Thus, during operation, the rolling members 271 are arranged to abut the surfaces of the interceptor member 5 and the rear plate 9b and can rotate independently of each other, while the toothed wheels 26 interact with the corresponding toothed guiding surfaces 28. It is beneficial to provide a toothed wheel 26 at the centre of the elongated rod 270, to prevent a bending of the rod 270, since a misalignment may prevent the rolling members 271 from rotating freely. Thanks to the diameter D1 of each of said plurality of rolling members 271 being substantially the same as the diameter D2 of the toothed wheels 26, the rolling members 271 abut the interceptor member 5 as well as the rear plate 9b during operation, to absorb any forces the interceptor member 5 is subjected to and prevent a bending or otherwise damaging of said interceptor member 5. Such a bending could otherwise result in damages to the interaction of the toothed wheels 26 with the corresponding toothed guiding surfaces 28 in preventing the teeth from intermeshing and thereby prevent the controlled smooth and symmetrical movement of the interceptor member 5 as described herein. Thanks to arranging the first guiding member 23 between the interceptor 5 and the rear plate 9b, and in the lower half of the housing, the effective lever arm regarding bending forces acting on the interceptor member 5 will be relatively short which improves upon the action thereof. Furthermore, since first guiding member is movably arranged it will follow the movement of the interceptor member 5 thereby further act beneficial regarding this aspect. Preferably the distance between to facing valleys 87, 88 of the gear racks 28 are slightly larger than the maximum diameter D5 of the toothed wheel, thereby preventing any substantial compressional load on the teeth of the wheel 26.

The invention is not to be seen as limited by the preferred embodiments described herein but can be varied within the scope of the appended claims, as is readily apparent to the person skilled in the art. For instance, it is evident that many different materials may be used. Moreover it is to be understood that the expression "toothed" shall be given a wide meaning including any arrangement that may provide the same functionality in accordance with the basic principles of the invention.

The invention claimed is:

1. An arrangement for dynamic control of running trim, list and/or yaw of a boat, said arrangement, comprising:
   a housing member,
   an interceptor member,
   an actuating means,
   a drive unit operated by a power supply, and
   a guiding arrangement, said guiding arrangement being arranged to guide said interceptor member between a first position and a second end position, said actuating means being arranged to displace said interceptor member in a movement between said first and second positions in relation to said housing member by being driven by said drive unit, and said housing member comprising a front plate and a rear plate enclosing said interceptor member in said first position and partially enclosing said interceptor member in said second position, wherein said guiding arrangement has a first guiding member and a second guiding member which are arranged to interact with each other to provide a parallel movement of said interceptor member in relation to said housing member, said first guiding member being a torque transferring, rotatable element having a base body arranged to extend transverse to the direction of displacement of said interceptor member and having at least two fixedly attached toothed wheels, said second guiding member comprising at least two toothed guiding surfaces fixedly arranged to said interceptor member interacting with said toothed wheels, characterized in that said first guiding member is movably arranged in between one plate of said housing member and said second guiding member, to follow the movement of said interceptor member.

2. The arrangement according to claim 1, characterized in that the base body also is arranged to act as a load transferring roll between said interceptor member and said housing member.

3. The arrangement according to claim 1, characterized in that said first guiding member is positioned between said interceptor member and the rear plate of said housing member.

4. The arrangement according to claim 1, characterized in that said first guiding member is in the form of a base body comprising an elongated torque transmitting rod, being arranged with a periphery, at least partly, having a diameter that is substantially the same as the interactive diameter of said toothed wheels.

5. The arrangement according to claim 4, characterized in that said periphery is formed by at least one separate rolling member.

6. The arrangement according to claim 5, characterized in that at least one of said toothed wheels is attached to said rod by means of a torque transferring male female inter fit.

7. The arrangement according to claim 1, characterized in that said second guiding member comprises at least two pairs of facing gear racks, one provided in one of the inner surfaces of the housing member and also one of the surfaces of said interceptor member.

8. The arrangement according to claim 7, characterized in that at least one of said toothed guiding surfaces is formed by means of a separate guiding device and that there is arranged a corresponding recess for said guiding device in at least one of said housing member or said interceptor member.

9. The arrangement according to claim 1, characterized in that roller members are positioned between said interceptor member and the other one of said plates of said housing member in relation to the position of said first guiding member.

10. The arrangement according to claim 1, characterized in that said actuating means comprises a drive unit having a drive shaft that protrudes through the housing member for interaction with a actuating means arranged within a recess within the interceptor member, in order to linearly displace said interceptor member towards said second position and reverse to said first position.

11. The arrangement according to claim 1, characterized in that said arrangement is attached to a substantially vertical surface of said stern and extends along a limited portion of the horizontal width of said surface along a transom edge of said stern.

12. A method for dynamic control of running trim and list of a boat, providing an arrangement, comprising:
 a housing member,
 an interceptor member,
 an actuating means,
 a drive unit operated by a power supply, and
 a guiding arrangement said guiding arrangement guiding said interceptor member between a first position and a second end position, said actuating means displacing said interceptor member in a movement between said first and second positions in relation to said housing member by being driven by said drive unit, and providing said housing member to comprise a front plate and a rear plate enclosing said interceptor member in said first position and partially enclosing said interceptor member in said second position, providing said guiding arrangement with a first guiding member and a second guiding member which are arranged to interact with each other to provide a parallel movement of said interceptor member in relation to said housing member, wherein said first guiding member transfers torque by means of a rotatable element having at least two fixedly attached toothed wheels to a base body extending transverse to the direction of displacement of said interceptor member, providing said second guiding member with at least two toothed guiding surfaces fixedly arranged to said interceptor member interacting with said toothed wheels, characterized in that said first guiding member is movable in between one plate of said housing member and said second guiding member.

13. The method according to claim 12, characterized by providing said base body to also act as a load transferring roll between said interceptor member and said housing member.

14. The arrangement according to claim 1, characterized by positioning said first guiding member between said interceptor member and the rear plate of said housing member.

15. The method according to claim 12, characterized by providing said second guiding member with at least two pairs of facing gear racks, one provided in one of the inner surfaces of the housing member and also one of the surfaces of said interceptor member.

16. The arrangement according to claim 5, wherein said periphery is formed by a plurality of separate rolling members.

17. The arrangement according to claim 8, wherein the corresponding recess for said guiding device is in both said housing member and said interceptor member.

18. The arrangement according to claim 4, wherein the elongated torque transmitting rod is in one part.

\* \* \* \* \*

UNITED STATES PATENT AND TRADEMARK OFFICE
CERTIFICATE OF CORRECTION

| | | |
|---|---|---|
| PATENT NO. | : 9,032,898 B2 | |
| APPLICATION NO. | : 14/010525 | |
| DATED | : May 19, 2015 | |
| INVENTOR(S) | : Christer Widmark | |

It is certified that error appears in the above-identified patent and that said Letters Patent is hereby corrected as shown below:

Title Page

At first word of title of application, change "Arrangment" to --Arrangement--

Signed and Sealed this
Twenty-ninth Day of September, 2015

Michelle K. Lee
*Director of the United States Patent and Trademark Office*